United States Patent [19]

MacLennan et al.

[11] 4,112,756
[45] Sep. 12, 1978

[54] ULTRASONIC AIR DATA SYSTEM

[75] Inventors: P. H. Barry MacLennan, Almonte; Graham A. Ireland, Ottawa; William J. Werba, Hazeldean, all of Canada

[73] Assignee: Canadian Patents and Development Limited, Ottawa, Canada

[21] Appl. No.: 828,225

[22] Filed: Aug. 26, 1977

[51] Int. Cl.² .................................................. G01P 5/00
[52] U.S. Cl. ..................................... 73/181; 73/194 A; 73/597
[58] Field of Search ..................... 73/181, 189, 194 A, 73/597

[56] References Cited

U.S. PATENT DOCUMENTS

| | | | |
|---|---|---|---|
| 3,222,926 | 12/1965 | Carver | 73/181 X |
| 3,901,078 | 8/1975 | McShane | 73/194 A |
| 4,015,470 | 4/1977 | Morrison | 73/53 X |
| 4,031,756 | 6/1977 | Rotier et al. | 73/189 |

Primary Examiner—Charles A. Ruehl
Attorney, Agent, or Firm—Edward Rymek

[57] ABSTRACT

The ultrasonic air data system determines the relative velocity of an aircraft with respect to the medium in one, two or three directions. In addition, it may determine the speed of sound and the approximate temperature. In the one direction system, a first ultrasonic transducer transmits a pulse to a second transducer where it is detected and reflected back to the first transducer and again reflected to the second transducer. The pulse transmit times for each direction are determined, and the relative velocity, the speed of sound and the approximate temperature are provided as a function of the transit time. In the two or three direction systems, three or four transducers are positioned in a two or three dimensional configuration. In the first half cycle, the first transducer transmits a pulse to the second where it is reflected to the third or last transducer in a two-dimension system and then to the last transducer in a three-dimension system. In the second half-cycle, the last transducer transmits a pulse which is reflected through the transducer arrangement to the first transducer. Transit times for pulse travel in each direction between pairs of transducers are determined, and relative velocities, speed of sound and approximate temperature are provided as a function of these transit times.

13 Claims, 8 Drawing Figures

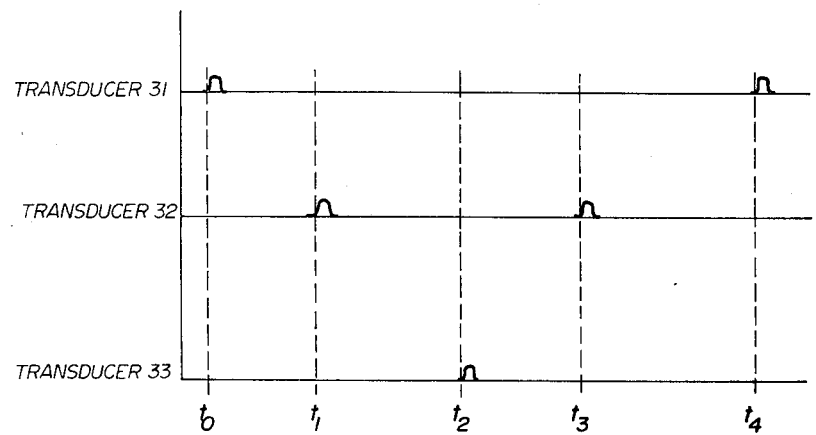
FIG. 4
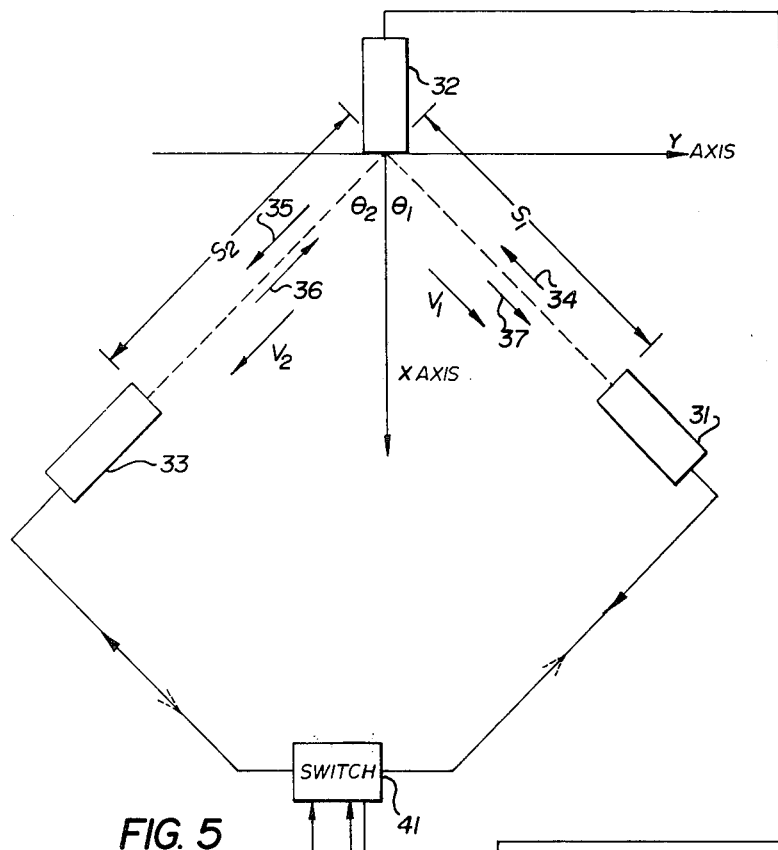
FIG. 5
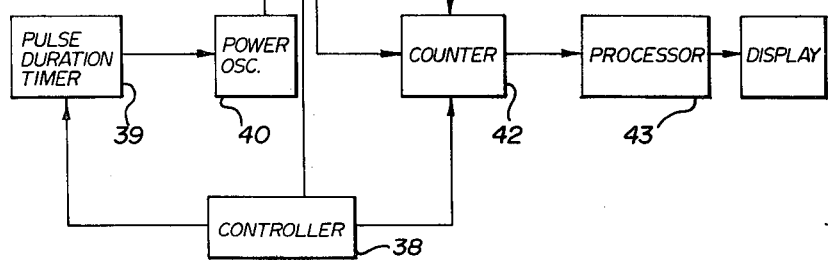

ULTRASONIC AIR DATA SYSTEM

BACKGROUND OF THE INVENTION

This invention is directed to an ultrasonic data system and in particular to an ultrasonic air data system for aircraft such as helicopters.

Prior art systems in wide use on current aircraft suffer from well-known and often fundamental problems and limitations, particularly in the measurement of low airspeeds at variable direction. The response characteristics of pitot-static systems are, by nature, extremely poor below a certain threshold velocity, typically 40 knots. These systems are inherently non-linear with velocity and are also sensitive to air density. To derive true airspeed from such systems requires scaling for air density and other variables. Problems can also arise due to contamination of the pressure-sensing tubes and ports, which is generally present to a greater degree in the helicopter operating environment.

Other prior art systems, such as those relying on measurement of the passage frequency of Von Karmann vortices shed from a bluff body in the airstream yield no information, intrinsically, concerning the direction of the flow.

Prior art systems based on rotating total pressure sensors have moving parts which lead to unreliability. They can also foul up due to water, ice and dirt in the environment.

Systems based on thermometric effects (differential cooling) are subject to severe inaccuracies caused by environmental conditions such as rain and icing, due to the high latent heats of water. They are also inherently non-directional.

A number of the above systems are discussed by B. M. Elson in the article — "Upgraded Helicopter Air Systems Urged" — published in the Aviation Week and Space Technology periodical of July 26, 1976, pages 46–53. Ultrasonic systems have generally been developed for use in liquid flow measurements, however as discussed in U.S. Pat. No. 3,548,653 which issued on Dec. 22, 1970, as well as in the above article, some systems, having mutually transmitting pairs of transducers, have been adapted to measure velocity of an aircraft through air.

SUMMARY OF THE INVENTION

It is therefore an object of this invention to provide an ultrasonic system for measuring velocity.

It is a further object of this invention to provide an ultrasonic system for measuring velocity in one, two or three directions.

It is a further object of this invention to provide an ultrasonic velocity measuring system which requires the use of fewer transducers and which provide accurate measurements.

It is another object of this invention to provide an ultrasonic system which can provide speed of sound and temperature data.

These and other objects are achieved in the ultrasonic systems in accordance with the present invention. In the single direction system, a first transducer transmits a controlled ultrasonic pulse through the medium to a second transducer which detects the incidence of the pulse and also detects the pulse after it is reflected back to and from the first transducer. The pulse transit times are determined in each direction from which relative velocity, speed of sound and approximate temperature are provided.

In the two direction system, three transducers are mounted in a plane. The first transducer transmits ultrasonic pulses to a second transducer where it is reflected to a third transducer. Then, the third transducer transmits ultrasonic pulses to the second transducer where it is reflected to the first transducer. As all of the transducers provide output signals upon incidence of the ultrasonic pulse, the pulse transit times between the pairs of transducers are determined.

In the three direction system, four transducers are mounted in three dimensional space. The first transducer transmits ultrasonic pulses to a second transducer where it is reflected to a third transducer where it is reflected to a fourth transducer. Then the fourth transducer transmits ultrasonic pulses to the third transducer for reflection to the second transducer for reflection to the first transducer. As all of the transducers provide output signals upon incidence of ultrasonic pulses, the pulse transit times between the pairs of transducers are determined.

In these systems, the appropriate transducers may be energized by a high frequency oscillator controlled by a pulse duration circuit. The transit times may be determined by a resettable counter and the relative velocities, speed of sound and approximate temperature may be provided by a processor coupled to the counter.

BRIEF DESCRIPTION OF THE DRAWINGS

In the drawings:

FIG. 4 illustrates pulse transit times for the system in FIG. 3;

FIG. 5 illustrates a second embodiment of a two-dimension air data system;

DESCRIPTION OF THE PREFERRED EMBODIMENT

Figure 1:
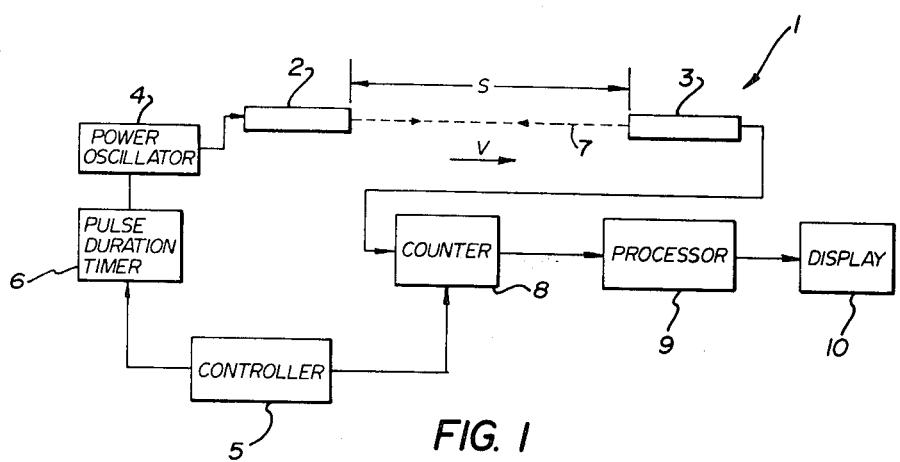
FIG. 1 illustrates a one dimension air data system.
Figure 2:
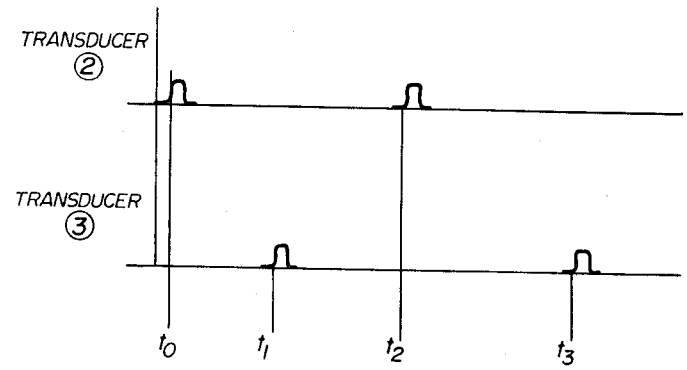
FIG. 2 illustrates pulse transit times for the system in FIG. 1.

In the one axis ultrasonic air data system 1, illustrated in FIG. 1, two transducers 2, 3 are positioned so as to face one another acoustically at some predetermined fixed distance S. A power oscillator 4 is connected to one of the transducers 2 and is controlled by a controller circuit 5 via a pulse duration timer 6. The controller 5 operates the timer 6 to activate the oscillator 4 providing a pulse burst of high frequency energy at time $t_0$ as shown in FIG. 2. An ultrasonic pulse is generated and transmitted through the medium towards transducer 3 along path 7. At the same time, the controller 5 starts a counter 8. When the ultrasonic pulse reaches the transducer 3 at time $t_1$, transducer 3 generates a signal which activates the counter 8 to transfer the count in the counter 8 to the processor 9 where it is stored, and the counter 8 continues to count.

Since the interfaces between transducers 3 and 2, and the surrounding medium provide an acoustic mismatch, a significant percentage of the ultrasonic pulse energy incident on the transducers is reflected. The pulse from transducer 2 is therefore reflected from transducer 3 to transducer 2 and then again reflected from transducer 2 at time $t_2$, towards transducer 3. Air is an acoustically soft medium whereas all transducers used, whether piezoelectric transducers or other, are acoustically hard. The portion of the incident wave which is reflected is given by $K$, where $$K = \frac{\rho_T C_T - \rho C}{\rho_T C_T + \rho C}$$

where
$\rho_T$ is the density of the transducer material,
$\rho$ is the density of air,
$C_T$ is the speed of sound in the transducer material,
$C$ is the speed of sound in air.

If the distance S is sufficiently small, i.e., in the order of 20 to 30 cm., the transducer 3 will generate a second signal at time $t_3$ upon incidence of the reflected ultrasonic pulse, this signal activates the counter 8 to transfer a second count to the processor 9 where it is stored. The transit times $\tau_{23}$ and $\tau_{32}$ for pulse travel from transducer 2 to 3 and transducer 3 to 2 respectively, may be determined since $$\tau_{23} = (t_1 - t_0)$$

and $$\tau_{32} = (t_3 - t_0) - 2(t_1 - t_0)$$

Now if transducer 2 is upstream from transducer 3, i.e., if the transducers 2 and 3 are moving through the medium from right to left, the velocity $V_{23}$ of the pulse from transducer 2 to 3 is $C + V$, where C is the local speed of sound and V is the velocity of medium flow along the axis joining the transducers 2 and 3. On the other hand, the velocity $V_{32}$ of the pulse from transducer 3 to 2 is $C - V$. Thus $$V_{23} = C + V = S/\tau_{23}$$

and $$V_{32} = C - V = S/\tau_{32}$$

Adding these equations $$C = \frac{S}{2}\left(\frac{1}{\tau_{23}} + \frac{1}{\tau_{32}}\right)$$

which is the speed of sound in the medium. Subtracting these equations $$V = \frac{S}{2}\left(\frac{1}{\tau_{23}} - \frac{1}{\tau_{32}}\right)$$

which is the relative speed of the medium with respect to the transducers along the transducer axis or the airspeed of the aircraft on which the transducers 2 and 3 are mounted.

The processor 9 thus provides C and V as absolute values independent of all other flow parameters such as temperature and pressure. This data may be displayed on a display 10 or provided in any form such as a recording for the aircraft pilot.

In addition, processor 9 may be used to provide other air data such as Mach number M, absolute static temperature T and free stream stagnation temperature $T_0$. The Mach number is determined from the equation $M = V/C$ while T is determined from the equation $C = \sqrt{\gamma R T}$ assuming that air is a perfect gas where $\gamma$ is the specific heat ratio of air, and R is the gas constant of air. Finally, $T_0$ is determined from the equation $$T_0 = T\left(1 + \frac{\gamma - 1}{2} M^2\right)$$

if the flow is assumed isentropic.

The speed of sound in air is a weak function of relative humidity and this will affect the determination of temperature T. However, the error is in the order of 1 percent even for saturated air, and is therefore considered to be insignificant for airborne use. It is noted however that the speed of sound C is true to the limits of measurement of $\tau$ providing the physical structure does not influence the airflow by its presence.

System resolution is dependent on the precision (number of significant digits) of measurement of $\tau_{23}$ and $\tau_{32}$ which relies on the reliability of the detection of the ultrasonic pulse. In practice, detection is facilitated by operating the transducers at as high a frequency as will traverse the air without undue absorption, by spacing the transducers as far apart as possible to obtain long transit times, and by using transducers having a diameter which will produce a beam having a sufficient beam divergence angle to compensate for cross flow. A frequency of about 100 kHz has been found to be practical when the distances S between transducers is approximately 15 cm. and the transducers have a diameter of approximately 1 cm. The attenuation (absorption) of ultrasound is a function of the square of the frequency, among other things and therefore $5 \times 10^5$ Hz would be the upper limit in a gas for transmission over these distances. In order to obtain satisfactory signal to noise ratios, $5 \times 10^4$ Hz would be the lower frequency limit.

The range of airspeeds measurable by this system is limited to slightly less than $\pm$ Mach 1. At Mach 1 the upstream transit time $\tau_{32}$ is infinite. In practice, the range will be limited by other considerations. As the airspeed increases, the upstream going pulse must travel through more air. Therefore, absorption and loss of intensity due to the spreading of the beam will play a part. However, at the same time, the downstream travelling pulse is stronger because it travels through less air.

Figure 3:
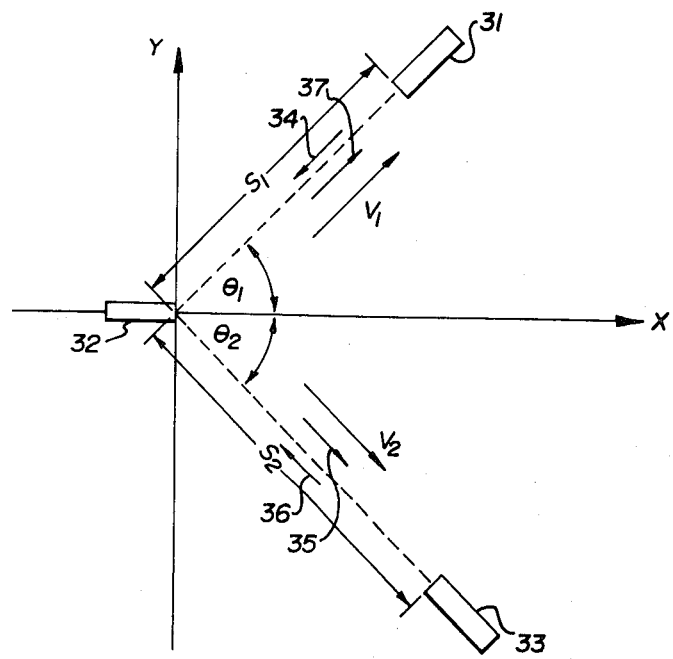
FIG. 3 schematically illustrates a first embodiment of a two-dimension air data system.

In order to measure airspeed along two orthogonal axes, i.e., the forward direction and the lateral direction, or side slip for a helicopter, the system schematically illustrated in FIG. 3 may be utilized. This system needs only three transducers 31, 32, and 33, instead of four transducers if two perpendicularly positioned systems of the type described in FIG. 1 are used. Two transducers 32 and 33 may be located on the X-axis or the helicopter forward direction axis, with transducers 31 and 32 on the Y-axis. This configuration minimizes the mathematical computations to determine velocity in the X and Y directions, however, it has been determined that signal loss and wake problems are avoided if transducers 31 and 33 are positioned at some fixed angle $\theta$ to the X-axis. In addition, for simplicity and effectiveness it is preferred that $\theta = 45°$ and that $S_1 = S_2$, as this angle yields equal resolution in the two axes.

The operation of the two-axis system illustrated in FIG. 3 will be described with reference to FIG. 4 which illustrates pulse transit times between the transducers. At time $t_0$, transducer 31 generates and transmits a short burst or pulse of ultrasonic energy into the medium. Transducers 31 and 32 are mutually aligned such that the pulse travels to transducer 32 and is reflected at time $t_1$ towards transducer 33, where it arrives at $t_2$. Transducers 32 and 33 are also mutually aligned such that the pulse will reflect off transducer 33 back to transducer 32 where it arrives at $t_3$, thence back to transducer 31 where it arrives at $t_4$. The pulse thus travels over four acoustic paths 34, 35, 36 and 37, between the transducers. The velocities of the pulse are a function of the local speed of sound C, and the ambient airspeed V. These velocities are related to the transit times of the pulse as follows: let $$\tau_{34} = t_1 - t_0$$

$$\tau_{35} = t_2 - t_1$$

$$\tau_{36} = t_3 - t_2$$

$$\tau_{37} = t_4 - t_3$$

Figure 6:
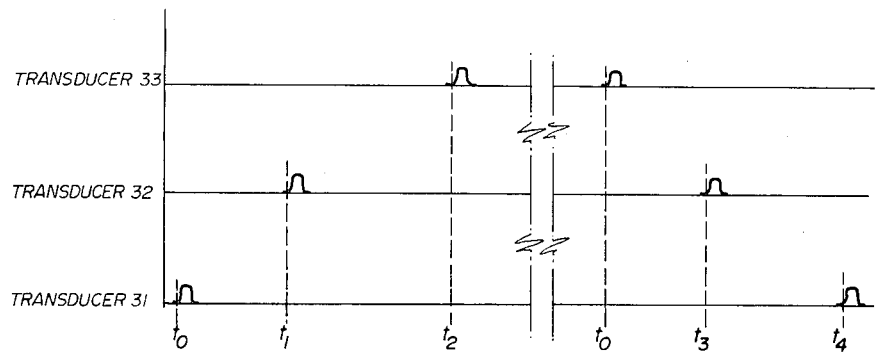
FIG. 6 illustrates pulse transit times for the system in FIG. 5.

In this mode of operation of the two-axis system, the amplitude of the initial pulse from transducer 31 must be high enough to enable the pulse to propagate along the four paths 34, 35, 36 and 37 between the transducers. The pulse will be attenuated due to absorption losses, as well as losses at the reflecting transducers since the pulse beam has a conical expansion envelope. In addition, transducer 31 must be switched from a transmit mode to receive mode during a very short interval. To overcome these problems, the system may be controlled as illustrated in FIG. 5 with reference to FIG. 6.

At time $t_0$ controller 38 operates pulse duration timer 39 which controls oscillator 40. Oscillator 40 generates a high frequency high energy pulse that is coupled to tranducer 31 via switch 41 which is also controlled by controller 38. Transducer 31 generates a short burst of ultrasonic energy which is transmitted to transducer 32. At time $t_1$ the pulse is reflected to transducer 33 where it arrives at time $t_2$. Transducer 32 is coupled to counter 42 where transit time $\tau_{34}$ between transducers 31 and 32 is counted and shifted to processor 43. Transducer 33 is also coupled to counter 42 via switch 41 where transit time $\tau_{35}$ between transducers 32 and 33 is counted and shifted to processor 43. In this half cycle, transducer 31 may be pulsed several times in succession thereby obtaining an average of the travel times $\tau_{34}$ and $\tau_{35}$ in processor 43.

In the second half cycle, controller 38 controls switch 41 such that the power oscillator 40 pulse is coupled to transducer 33 to generate an ultrasonic pulse at time $t_0'$. The pulse travels along path 36 during a time interval $\tau_{36}$ to transducer 32 and then upon reflection, to transducer 31 during a time interval $\tau_{37}$. Once again transducer 32 is directly coupled to counter 42 and transducer 31 is coupled to counter 42 via switch 41. Counter 42 counts the transit times $\tau_{36}$ and $\tau_{37}$ and shifts these counts to processor 43. The transit times in the complete cycle are therefore:

$$\tau_{34} = t_1 - t_0$$

$$\tau_{35} = t_2 - t_1$$

$$\tau_{36} = t_3 - t_0'$$

$$\tau_{37} = t_4 - t_3$$

In either mode of operation, i.e., the modes described in FIGS. 2 or 4;

$$\tau_{34} = \frac{S_1}{C - V_1}$$

$$\tau_{37} = \frac{S_1}{C + V_1}$$

$$\tau_{35} = \frac{S_2}{C + V_2}$$

$$\tau_{36} = \frac{S_2}{C - V_2}$$

where
 $C$ is the local speed of sound;
 $S_1$ is the distance between transducers 31 and 32;
 $S_2$ is the distance between transducers 32 and 33;
 $V_1$ is the medium velocity between transducers 31 and 32;
 $V_2$ is the medium velocity between transducers 32 and 33.

Then $$\frac{1}{\tau_{34}} + \frac{1}{\tau_{37}} = \frac{C + V_1}{S_1} + \frac{C - V_1}{S_1} = \frac{2C}{S_1}$$

and $C = \frac{S_1}{2}\left(\frac{1}{\tau_{34}} + \frac{1}{\tau_{37}}\right)$

Similarly $$\frac{1}{\tau_{36}} + \frac{1}{\tau_{35}} = \frac{C + V_2}{S_2} + \frac{C - V_2}{S_2} = \frac{2C}{S_2}$$

and $C = \frac{S_2}{2}\left(\frac{1}{\tau_{36}} + \frac{1}{\tau_{35}}\right)$

If the speed of sound does not change during the time measurement, then $$S_1\left(\frac{1}{\tau_{34}} + \frac{1}{\tau_{37}}\right) = S_2\left(\frac{1}{\tau_{36}} + \frac{1}{\tau_{35}}\right)$$

and if $S_1 = S_2$ then $\frac{1}{\tau_{34}} + \frac{1}{\tau_{37}} = \frac{1}{\tau_{36}} + \frac{1}{\tau_{35}}$ This serves as a data validation and system check function. If the identity is not satisfied within some allowable error limit, it means the system is faulty and/or atmospheric conditions have changed exceedingly quickly during the measurement period. Further $$\frac{1}{\tau_{37}} - \frac{1}{\tau_{34}} = \frac{C + V_1}{S_1} - \frac{C - V_1}{S_1} = \frac{2V_1}{S_1}$$

and $V_1 = \frac{S_1}{2}\left(\frac{1}{\tau_{37}} - \frac{1}{\tau_{34}}\right)$

-continued

Similarly $$\frac{1}{\tau_{35}} - \frac{1}{\tau_{36}} = \frac{C+V_2}{S_2} - \frac{C-V_2}{S_2} = \frac{2V_2}{S_2}$$

and $V_2 = \frac{S_2}{2}\left(\frac{1}{\tau_{35}} - \frac{1}{\tau_{36}}\right)$

For generating further data such as Mach number, and temperature the speed of sound can be averaged as the local speed of sound $C_a$.

$$C_a = \frac{\frac{S_1}{2}\left(\frac{1}{\tau_{34}} + \frac{1}{\tau_{37}}\right) + \frac{S_2}{2}\left(\frac{1}{\tau_{36}} + \frac{1}{\tau_{35}}\right)}{2}$$

and $C_a = \frac{S}{4}\left(\frac{1}{\tau_{34}} + \frac{1}{\tau_{37}} + \frac{1}{\tau_{36}} + \frac{1}{\tau_{35}}\right)$ where $S_1 = S_2 = S$.

In order to obtain the forward speed $V_x$ and the lateral speed $V_y$:

$$V_x = \frac{V_1 + V_2}{2\cos\theta}$$
$$V_y = \frac{V_1 - V_2}{2\sin\theta}$$

Figure 7:
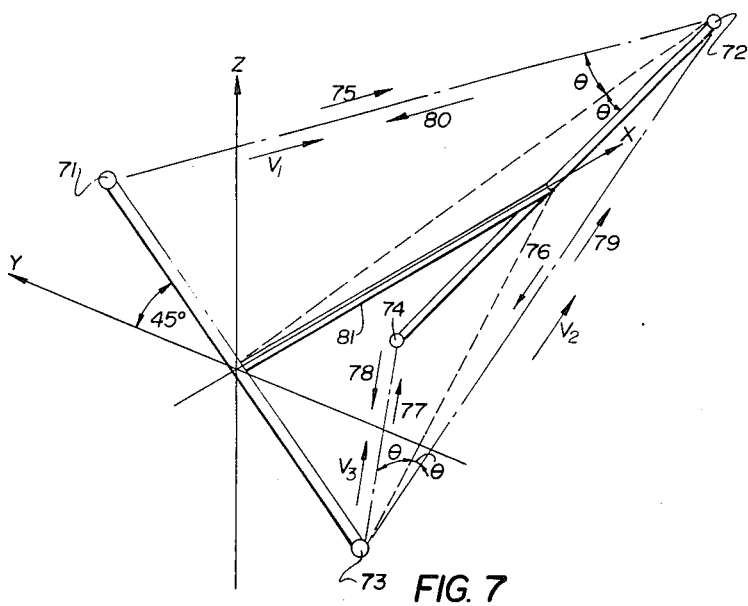
FIG. 7 schematically illustrates a three-dimension air data system.

The three-axis system illustrated in FIG. 7 includes four transducers 71, 72, 73 and 74 for determining velocities in the three dimensions, the forward velocity in the X-direction, the lateral velocity in the Y-direction and the vertical velocity in the Z-direction.

In its most effective form, the transducers 71, 72, 73 and 74 are positioned on a supporting structure 81 to form the corners of a symmetrical right angle tetrahedron with the forward direction being the X-axis as shown such that the angle $\theta$ is 45° and the length of all paths between the transducers 71 to 72, 72 to 73, and 73 to 74 are equal.

Figure 8:
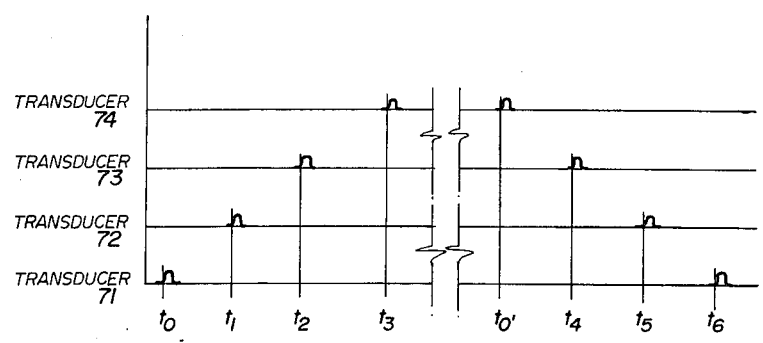
FIG. 8 illustrates pulse transit times for the system in FIG. 7.

In the same manner as the system shown in FIG. 5, at time $t_0$ a first transducer 71 is pulsed to transmit a short burst of ultrasonic energy towards the second transducer 72 along a path 75. The pulse as seen in FIG. 8 is detected by transducer 72 at time $t_1$ and reflected towards the third transducer 73 along a path 76. The pulse is detected by transducer 73 at time $t_2$ and reflected along a path 77 towards the fourth transducer 74 which detects the pulse at $t_3$. After one or more ultrasonic pulses from transducer 71, the transit times $\tau_{75}$, $\tau_{76}$, and $\tau_{77}$ of the pulse along paths 75, 76 and 77 are determined as:

$$\tau_{75} = t_1 - t_0$$
$$\tau_{76} = t_2 - t_1$$
$$\tau_{77} = t_3 - t_2$$

Transducer 71 is then switched to receive and transducer 74 is switched to transmit. At a time, $t_0'$, as seen in FIG. 8, transducer 74 transmits a pulse along path 78 to transducer 73 where it is detected at time $t_4$. The pulse is then reflected along path 79 towards transducer 72 where it is detected at time $t_5$, and finally the pulse is reflected along path 80 towards transducer 71 where it is detected at time $t_6$. The transit times $\tau_{78}$, $\tau_{79}$ and $\tau_{80}$ are then determined as being:

$$\tau_{78} = t_4 - t_0'$$
$$\tau_{79} = t_5 - t_4$$
$$\tau_{80} = t_6 - t_5$$

From these transit times, the local speed of sound as well as the medium velocities $V_1$, $V_2$ and $V_3$ between transducers 71 and 72, 72 and 73, and, 73 and 74 respectively may be determined since:

$$\tau_{75} = \frac{S}{C+V_1}, \quad \tau_{80} = \frac{S}{C-V_1}$$
$$\tau_{76} = \frac{S}{C-V_2}, \quad \tau_{79} = \frac{S}{C+V_2}$$
$$\tau_{77} = \frac{S}{C+V_3}, \quad \tau_{78} = \frac{S}{C-V_3}$$

The local speed $C$ of sound is then:

$$C = \frac{S}{2}\left(\frac{1}{\tau_{75}} + \frac{1}{\tau_{80}}\right)$$

or $C = \frac{S}{2}\left(\frac{1}{\tau_{76}} + \frac{1}{\tau_{79}}\right)$ or $C = \frac{S}{2}\left(\frac{1}{\tau_{77}} + \frac{1}{\tau_{78}}\right)$ Since these three values will not be exactly identical, the local speed may be averaged as:

$$C = \frac{S}{6}\left(\frac{1}{\tau_{75}} + \frac{1}{\tau_{76}} + \frac{1}{\tau_{77}} + \frac{1}{\tau_{78}} + \frac{1}{\tau_{79}} + \frac{1}{\tau_{80}}\right)$$

The medium velocities are also determined as:

$$V_1 = \frac{S}{2}\left(\frac{1}{\tau_{75}} - \frac{1}{\tau_{80}}\right)$$

$$V_2 = \frac{S}{2}\left(\frac{1}{\tau_{79}} - \frac{1}{\tau_{76}}\right)$$

and $$V_3 = \frac{S}{2}\left(\frac{1}{\tau_{77}} - \frac{1}{\tau_{78}}\right)$$

From these values, the relative velocities along the X, Y and Z axis may be determined using the following equations:

$$V_x = \frac{V_3 + V_1}{2\cos\theta}$$
$$V_y = \frac{V_3 - V_1}{2\sin\theta}$$
$$V_z = \frac{2V_2 - V_3\cos\theta - V_1\cos\theta}{2\sin\theta}$$

Though the preferred embodiments have been described as air data systems, the ultrasonic system may also be used with other mediums such as gaseous mediums.

We claim:

1. An ultrasonic system for determining data in a medium comprising:
   first ultrasonic transducer means;
   second ultrasonic transducer means positioned accoustically facing the first ultrasonic transducer means at a predetermined distance;
   means for energizing the first transducer means to generate a controlled ultrasonic energy pulse for transmission through the medium to the second transducer means, a portion of the ultrasonic energy pulse incident on the second transducer means being reflected from the second transducer means to the first transducer means and back to the second transducer means through the medium, whereby the second transducer means provides successive output signals for successive ultrasonic energy pulse incidence; and
   means coupled to the second transducer means for receiving the output signals to determine the ultrasonic energy pulse transit times from the first transducer to the second transducer and from the second transducer to the first transducer.

2. An ultrasonic system as claimed in claim 1 which further includes processing means coupled to the transit time determining means for providing the relative velocity of the first and second transducers with respect to the medium as a function of the ultrasonic energy pulse transit times.

3. An ultrasonic system as claimed in claim 2 wherein the processing means further provides the speed of sound in the medium as a function of the ultrasonic energy pulse transit times.

4. An ultrasonic system as claimed in claim 3 wherein the processing means further provides an approximation of medium temperature as a function of the speed of sound in the medium.

5. An ultrasonic system for determining data in a medium comprising:
   first, second and third ultrasonic transducer means mounted in a plane, the second transducer means being located on an axis within said plane, the first and third transducer means accoustically facing said second transducer means at substantially identical angles $\theta$ from said axis, the first transducer means being a fixed distance $S_1$ from the second transducer and the third transducer being a fixed distance $S_2$ from the second transducer;
   transducer energizing means for providing controlled high frequency pulses;
   switching means for coupling the transducer energizing means in turn to the first and third transducer means whereby the first transducer means periodically generates an ultrasonic energy pulse for transmission through the medium to the second transducer means for reflection to the third transducer means, and the third transducer means periodically generates an ultrasonic energy pulse for transmission through the medium to the second transducer means for reflection to the first transducer means, the first, second and third transducer means providing output signals in response to ultrasonic energy pulse incidence;
   means coupled to the first, second and third transducer means for receiving the transducer means output signals to determine ultrasonic energy pulse transit time from the first transducer means to the second transducer means, from the second transducer means to the third transducer means, from the third transducer means to the second transducer means, and from the second transducer means to the first transducer means.

6. An ultrasonic system as claimed in claim 5 which further includes processing means coupled to the transit time determining means for providing the relative velocity of the first and second transducer with respect to the medium as a function of the pulse transit times between the first and second transducers; and the relative velocity of the second and third transducer with respect to the medium as a function of the pulse transit times between the second and third transducers.

7. An ultrasonic system as claimed in claim 6 wherein $S_1 = S_2$ and $\theta = 45°$.

8. An ultrasonic system for determining data in a medium comprising:
   first, second, third and fourth ultrasonic transducer means positioned in three-dimensional space, such that a line joining the first and third transducer means falls outside a plane through a line joining the second and fourth transducers, and the transducers facing one another accoustically such that an ultrasonic energy pulse emitted from the first transducer means is transmitted to the second transducer means, reflected to the third transducer means and reflected to the fourth transducer means;
   transducer energizing means for providing controlled high frequency pulses;
   switch means for coupling the transducer energizing means in turn to the first and fourth transducer means whereby the first transducer means periodically generates an ultrasonic energy pulse for transmission through the medium and the fourth transducer means periodically generates an ultrasonic energy pulse for transmission through the medium, the first, second, third and fourth transducer means providing output signals in response to ultrasonic energy pulse incidence; and
   means coupled to the first, second, third and fourth transducer means for receiving the transducer means output signals to determine ultrasonic energy pulse transit time in each direction between the first and second transducer, means, the second and third transducer means, and the third and fourth transducer means.

9. An ultrasonic system as claimed in claim 8 which further includes processing means coupled to the transit time determining means for providing the relative velocity of the first and second transducer means with respect to the medium as a function of the pulse transit times between the first and second transducers, the relative velocity of the second and third transducer means with respect to the medium as a function of the pulse transit times between the second and third transducers and the relative velocity of the third and fourth transducer means with respect to the medium as a function of the pulse transit times between the third and fourth transducer means.

10. An ultrasonic system as claimed in claim 9 wherein the transducer means are located at the corners of a symmetric tetrahedron.

11. An ultrasonic system as claimed in claim 10 wherein the transducer energizing means consists of a controlled high frequency oscillator means and pulse duration timer for controlling the oscillator means.

12. An ultrasonic system as claimed in claim 11 wherein the frequency of the oscillator means is from $5 \times 10^4$ to $5 \times 10^5$ Hz.

13. An ultrasonic system as claimed in claim 11 wherein said pulse transit time determining means includes a resettable counter means.

* * * * *